United States Patent
Rajendran et al.

(10) Patent No.: US 11,595,450 B1
(45) Date of Patent: Feb. 28, 2023

(54) ELECTRONIC COMMUNICATION METHOD TO PROVIDE VISUAL ASSISTANCE TO A PARTICIPANT FROM AN ADVISOR VIA PRIVATE COMMUNICATION

(71) Applicant: Mitel Networks Corporation, Kanata (CA)

(72) Inventors: Boopalan Rajendran, Bangalore (IN); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 0 days.

(21) Appl. No.: 17/464,593

(22) Filed: Sep. 1, 2021

(51) Int. Cl.
*H04L 65/401* (2022.01)
*H04L 65/1069* (2022.01)

(52) U.S. Cl.
CPC ...... *H04L 65/4015* (2013.01); *H04L 65/1069* (2013.01)

(58) Field of Classification Search
CPC . H04L 65/1069; H04L 65/4015; H04L 51/56; G06Q 30/02; G06Q 30/0643; G09B 5/06; H04M 1/72451; H04M 3/56; H04M 3/567; H04W 4/029; H04W 4/20
See application file for complete search history.

(56) References Cited

U.S. PATENT DOCUMENTS

| | | | | |
|---|---|---|---|---|
| 8,781,841 | B1* | 7/2014 | Wang | H04M 3/56 704/275 |
| 2012/0030194 | A1* | 2/2012 | Jain | H04M 1/72451 707/E17.141 |
| 2012/0308970 | A1* | 12/2012 | Gillespie | G09B 5/06 434/236 |
| 2013/0072144 | A1* | 3/2013 | Berger | H04W 4/029 455/404.1 |
| 2020/0279439 | A1* | 9/2020 | Callaghan | G06Q 30/0643 |
| 2021/0090094 | A1* | 3/2021 | Bond | G06Q 30/02 |
| 2021/0258757 | A1* | 8/2021 | McGovern | H04W 4/20 |
| 2021/0400142 | A1* | 12/2021 | Jorasch | H04M 3/567 |
| 2022/0284904 | A1* | 9/2022 | Pu | H04L 51/56 |

OTHER PUBLICATIONS

Sikorski, Laura, Genesys Blog, "Employee Satisfaction Operations That Drive Customer Satisfaction", Website https://www.genesys.com/blog; Nov. 25, 2020.
Genesys Blog, "3 Benefits of Real-Time Monitoring in the Call Center", Website https://www.genesys.com/blog; May 23, 2019.

* cited by examiner

*Primary Examiner* — Le H Luu

(57) ABSTRACT

An electronic communication method and system for providing private communications from one or more advisors to a participant of an electronic communication are provided. Exemplary methods include establishing an electronic communication between two or more participants (e.g., using a first communication session) and establishing a private session between an advisor and one or more of the participants.

20 Claims, 10 Drawing Sheets

ELECTRONIC COMMUNICATION METHOD TO PROVIDE VISUAL ASSISTANCE TO A PARTICIPANT FROM AN ADVISOR VIA PRIVATE COMMUNICATION

FIELD OF THE INVENTION

The present disclosure generally relates to electronic communication methods and systems. More particularly, examples of the disclosure relate to electronic communication methods and systems that provide visual assistance to a participant during an electronic communication.

BACKGROUND OF THE DISCLOSURE

Electronic communication systems and methods can be used for a variety of applications. For example, electronic communication methods allow participants to communicate using audio, video, and written (e.g., presentation) materials.

Generally, during such communications, all participants receive all of the audio and video conference information. In some cases, private chat messages or the like may be sent to individual participants during the communication. In other cases, a supervisor or manager may join the communication as a participant and may provide advice to a participant (e.g., an employee or contractor) during the communication.

While such methods and systems can work for a variety of applications, such systems and methods often do not allow a participant in such a communication to receive private input from a third party in cases in which the third party is not part of the communication and/or does not receive audio, video, and/or other information from one or more (e.g., all) of the other participants during the communication. Use of such private communications may be particularly desirable in situations in which it is desirable to have a presenter appear knowledgeable and in which it may be desirable to not show other participants that the presenter is receiving assistance from one or more advisors. Accordingly, improved methods and systems that allow for a private communication between a communication participant and a third party (e.g., an advisor) during an electronic communication are desired.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that can, for example, provide visual information to a participant (e.g., a presenter) of an electronic communication (sometimes referred to herein as a meeting) from a third-party advisor. While the ways in which the present disclosure addresses various drawbacks of prior systems and methods are described in more detail below, in general, various systems and methods described herein establish a private communication between one or more participants of an electronic communication and one or more advisors. In accordance with examples of the disclosure, participants that are not part of the private communication with an advisor will not see or hear information from the advisor(s) and/or the advisors will not see and/or hear information from participants that are part of the electronic communication, but not part of the private communication. This allows one or more advisors to provide a participant/presenter with information during the communication, without the other participants' knowledge of the advisor's input and without requiring permissions from the other participants to join the communication.

Figure 1:
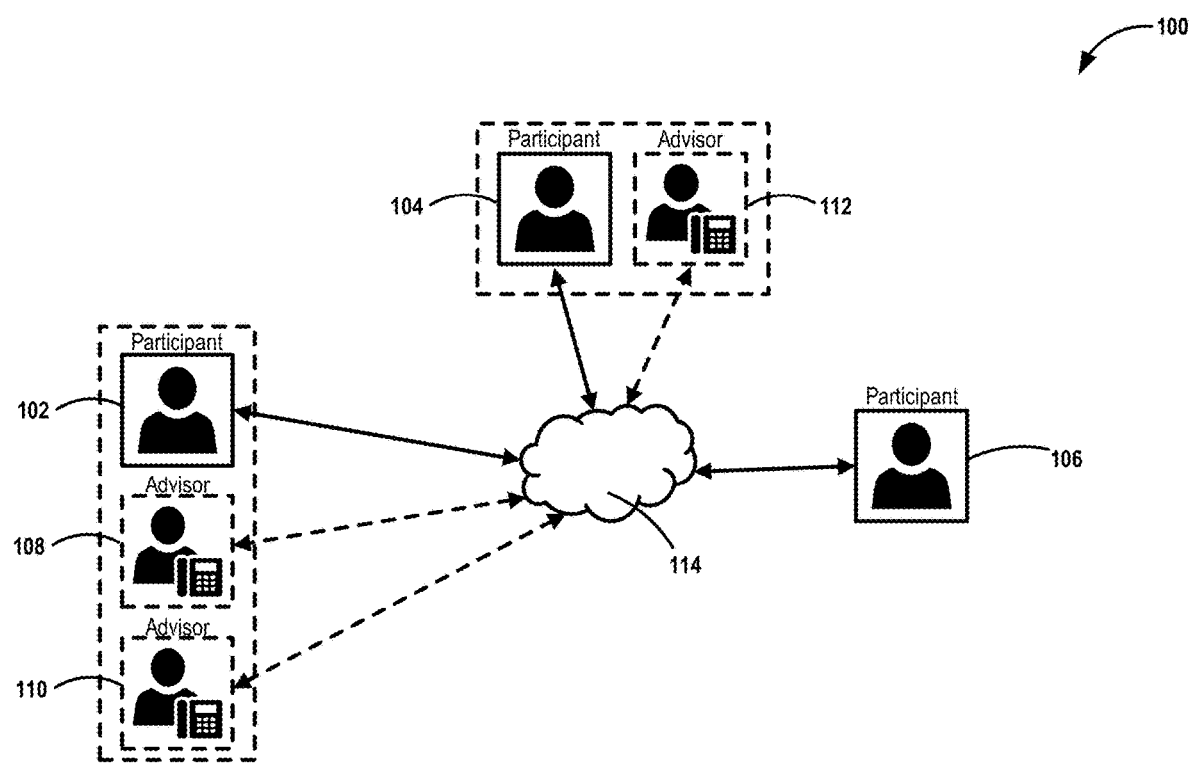
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. Electronic communication system 100 includes a first participant client 102, a second participant client 104, and a third participant client 106 coupled to a communication network 114. In the illustrated example, system 100 also includes a first advisor client 108, a second advisor client 110, and a third advisor client 112. Although illustrated with three participant clients 102-106 and three advisor clients 108-112, systems (e.g., system 100) in accordance with this disclosure can include any suitable number (e.g., two or more) participant clients and any suitable number (e.g., one or more) advisor clients.

Participant clients 102-106 can be used to send electronic communications to/from each other and/or to other devices connected to communication network 114. Participant clients 102-106 can be or include any suitable device with wired or wireless communication features that can connect to network 114. For example, participant clients 102-106 can include a wearable device, a tablet computer, a wired phone, a mobile phone, a personal (e.g., laptop or desktop) computer, a streaming device, such as a game console or other media streaming device, or the like. One or more of participant clients 102-106 can include an application or software client to perform various functions set forth herein and/or to cause to be displayed text and/or other information as described herein. For example, participant clients 102-106 can be used to convey and display information during a meeting. In some cases, participant clients 102-106 can be used to selectively communicate with the first advisor or one or more other participants.

Advisor clients 108-112 can similarly be used to send electronic communications to/from each other, to participant clients 102-106, and/or to other devices connected to communication network 114. Advisor clients 108-112 can be or include any suitable device with wired or wireless communication features that can connect to network 114, such as a wearable device, a tablet computer, a wired phone, a mobile phone, a personal (e.g., laptop or desktop) computer, a streaming device, such as a game console or other media streaming device, or the like. One or more of advisor clients 108-112 can include an application or client to perform various functions set forth herein and/or to cause to be displayed text and/or other information as described herein. For example, in some cases, advisor clients can be used to receive information from a participant client. In some cases, advisor clients can be used to edit the meeting information, as described below.

Network 114 can include or be, for example, an internet protocol (IP) network. Exemplary types of networks suitable for communication with network 114 can be or include a local area network, a wide-area network, a metropolitan area network, wireless networks, a private branch exchange (PBX), or a portion of the Internet. Various components of network 114 can be coupled to one or more other components using an Ethernet connection, other wired connections, and/or wireless interfaces. Network 114 can be coupled to other networks and/or to other devices typically coupled to networks. By way of particular example, network 114 includes a communication network and network 114 can be coupled to additional networks that can be coupled to one or more devices, such as clients 102-112.

Various embodiments of the disclosure provide improved systems that allow communication between two or more participant clients and private communications between one or more advisor clients and one or more participant clients. In the example illustrated in FIG. 1, advisor clients 108, 110 can have a private communication with participant client 102 and advisor client 112 can have a private communication with participant client 104, during an electronic communication between participant clients 102-106. In some cases, advisors client 108, 110 can communicate with each other during the electronic communication. In other cases, advisor client 108, 110 do not communicate with each other.

Figure 2:
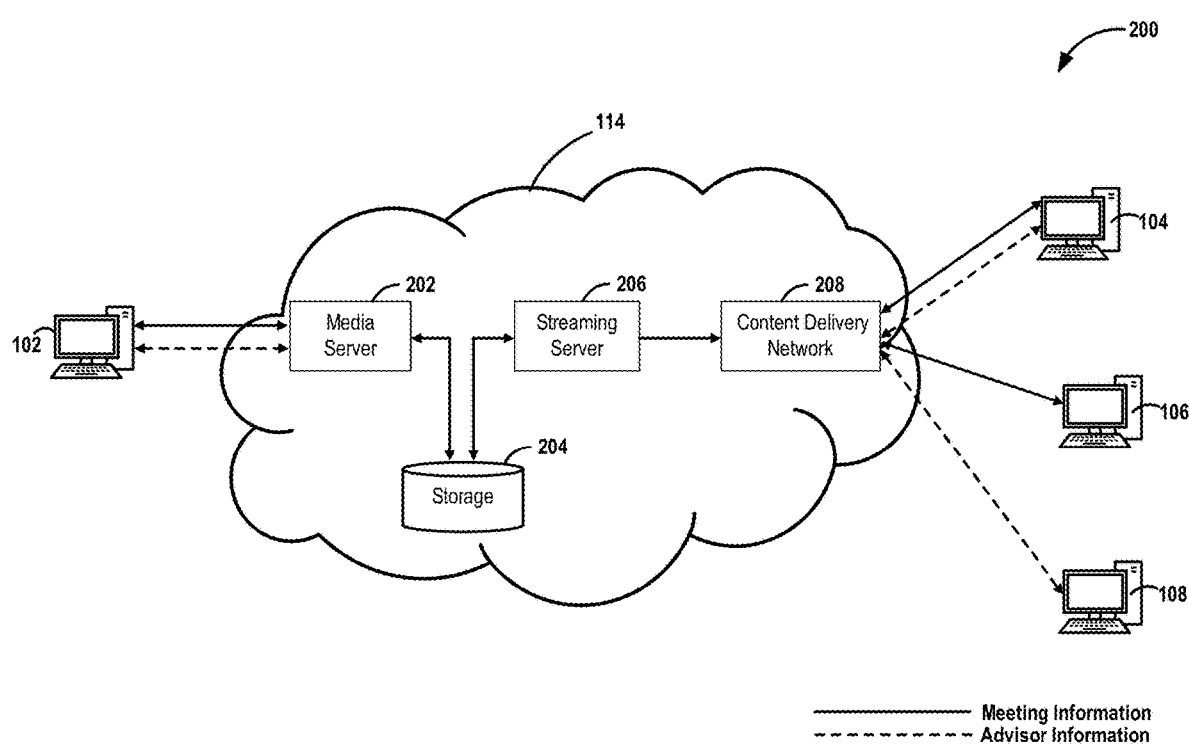
FIG. 2 illustrates a portion of an electronic communication system in accordance with exemplary embodiments of the disclosure in greater detail.

FIG. 2 illustrates a portion 200 of system 100 in greater detail. Portion 200 includes participant clients 102-106, advisor client 108, and network 114. In the illustrated example, network 114 includes a media server 202, a storage device 204, a streaming server 206, and a content delivery network 208. However, in accordance with other examples, one or more of media server 202, storage device 204, streaming server 206, and content delivery network 208 can be external to network 114 or be part of one or more clients 102-112. While various protocols can be used to transmit information using system 100 and portion 200, examples of the disclosure are conveniently described below in connection with transmitting information over channels (e.g., first, second) using real-time transport protocol (RTP).

Media server 202 is communicatively coupled to one or more participant clients 102-106 and one or more advisor clients 108-112. Media server 202 can be or include any suitable computing device, such as a server. Media server 202 can be configured to mix conferencing information between two or more participants and can be further configured to establish a private communication channel between a participant client (e.g., participant client 102) and an advisor client (e.g., advisor client 108). Exemplary functions of media server 202 are described in more detail below in connection with FIGS. 7-9.

As illustrated, storage device 204 can be coupled to the media server and streaming server 206. Storage device 204 can be or include any suitable storage medium. By way of example, storage device 204 can be or include a computer or server to store information. Storage device 204 can use one or more of Microsoft SQL Server, MySQL, Microsoft Access, Oracle, or the like relational database systems. Further, although illustrated as a single device, storage device 204 can include multiple devices and/or can be combined with other databases. In accordance with examples of the disclosure, storage device 204 stores meeting information, such as presentations, videos, text, and the like. In accordance with further examples, one or more participants can manipulate the meeting information. And, in accordance with further examples, advisors with the requisite permission can manipulate meeting information associated with a participant that has granted the advisor requisite permission. For example, if an advisor is associated with a participant, that participant can grant his or her advisor permission to manipulate his or her meeting information—e.g., during a meeting.

Streaming server 206 can be or include any suitable server for streaming content received from one or more clients 102-108 to other clients 102-108. For example, streaming server 206 can provide electronic communication (e.g., audio, video, text, and/or email) between client 102 and one or more other devices, such as clients 104, 106 and visual information between advisor client 108 and participant client 102 (and 104 in the illustrated example).

Content delivery network 208 can be coupled to streaming server 206. Content delivery network 208 can include any suitable network. In accordance with various embodiments of the disclosure, content delivery network 208 can include one or more servers configured to distribute content between one or more clients 102-108. Content delivery network 208 can include an internet exchange point at, for example, an edge of network 114.

As set forth in more detail below, system 200 can be configured, such that a participant client (e.g., participant client 102) communicates with one or more other participant clients (e.g., clients 104, 106) using a first channel of the media server, and the participant client and an advisor client (e.g., clients 108, 110) communicate in private mode using a second channel of the media server.

A participant client can display information received on the first channel and information received on the second channel. For example, information received on the first channel can be displayed in a first area and information received on the second channel can be displayed on a second area of a user interface. User interfaces as described herein can be displayed on respective participant and advisor devices.

Figure 3:
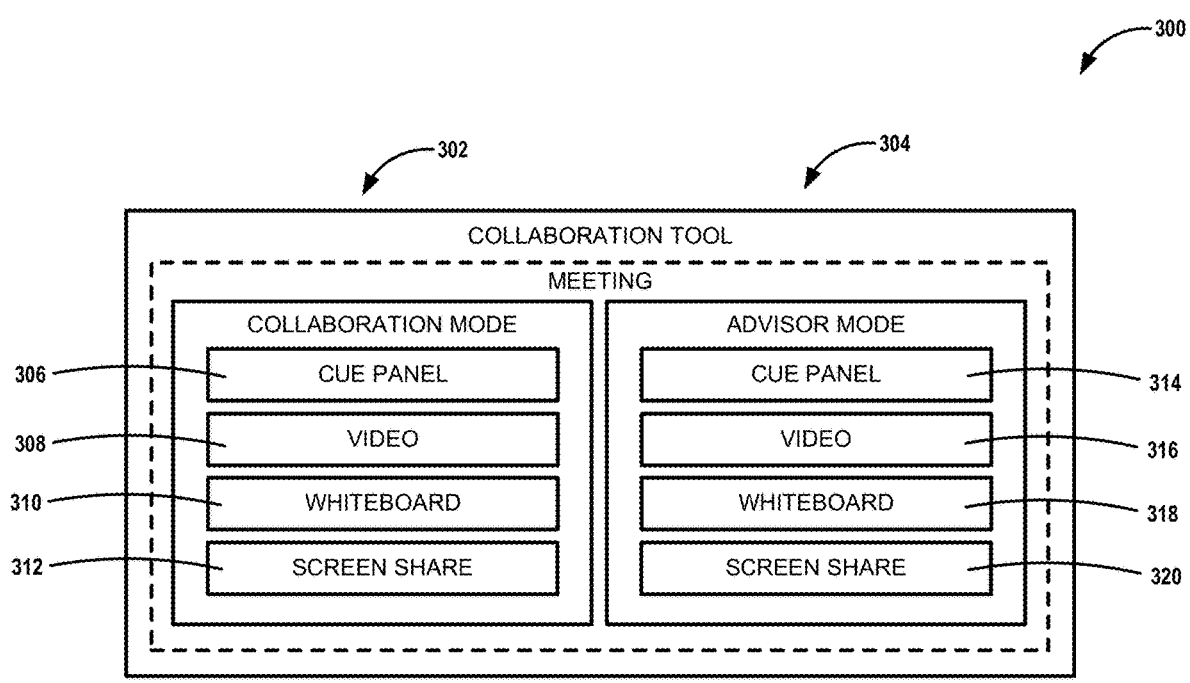
FIG. 3 illustrates a participant user interface in accordance with exemplary embodiments of the disclosure.
Figure 4:
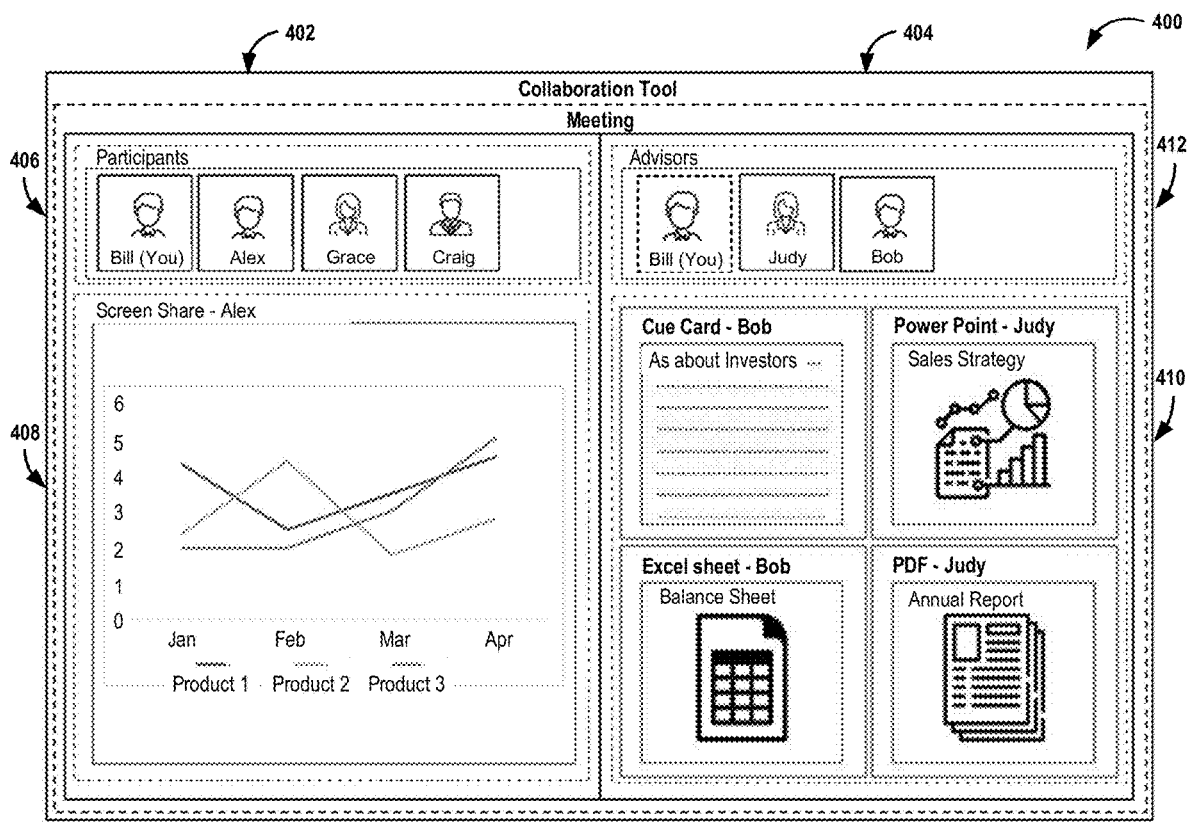
FIGS. 4 and 5 illustrate additional participant user interfaces in accordance with exemplary embodiments of the disclosure.
Figure 5:
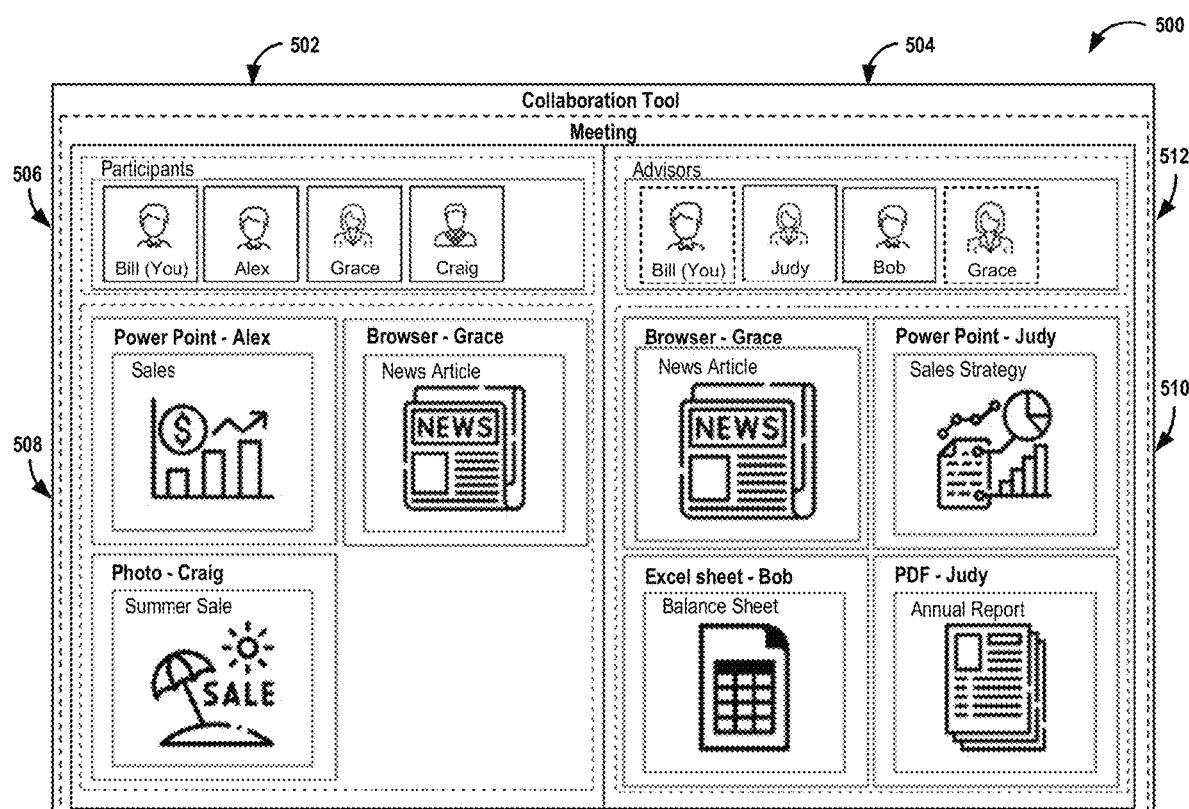

Turning now to FIGS. 3-5, exemplary user interfaces 300, 400, and 500, suitable for use with participant clients 102-106, are illustrated. The illustrated user interfaces are merely exemplary and are not meant to limit the scope of the present disclosure. The exemplary user interfaces illustrate various methods and functions of the present disclosure.

User interface 300 includes a first area 302 to display participant information (e.g., from the first channel) and a second area 304 to display advisor information from one or more advisors (e.g., from the second channel). As illustrated, participant information that can be displayed can include cue panel information 306, video information 308, whiteboard information 310, and screen sharing information 312 from one or more meeting participants. Similarly, advisor information that is displayed in second area 304 can include cue panel information 314, video information 316, whiteboard information 318, and screen sharing information 320 from one or more advisors. Although illustrated with one area 304 for presentation of advisor information, user interfaces in accordance with further examples of the disclosure can include additional areas to receive information from one or more additional advisors or information from additional advisors can also be displayed in area 304. In accordance with examples of the disclosure, a participant can select or deselect one or more categories of information 306-320 to be displayed on the participant's client.

User interface 400 can be the same or similar to user interface 300. In the illustrated example, user interface 400 includes first area 402 that displays participant information and a second area 404 to display advisor information from one or more advisors. First area 402 (e.g., corresponding to information received on a first channel) includes an indication (e.g., pictures, text, or the like) of (e.g., active) participants to the communication and a second area for advisor information (e.g., received on a second channel). In the illustrated example, first area 402 includes a screen sharing display 408. Similarly, second area 404 includes an indication (e.g., pictures, text, or the like) of (e.g., active) advisors to the communication in area 412 and advisor information in area 410.

In this example, two advisors are assisting a meeting participant (Bill). The meeting participants are Bill, Alex, Grace, and Craig, who all receive shared audio and video information. Advisors Bob and Judy are providing visual assistance to Bill and only share visual information with Bill. Bob and Judy do not receive any audio information in this example. During the meeting, Alex is sharing his screen. During Alex's presentation, Bob is visually communicating to Bill—e.g., prompting Bill to ask a question as well as sharing a spreadsheet that has information with Bill. Judy (another advisor) is also visually assisting Bill—e.g., with presentation material.

In some cases, an advisor client can drive a participant's content delivery remotely. For example, in some cases, advisor Bob or Judy can take over Bill's presentation, and if authorized/granted requisite permission, could take over presentations of other participants. In other cases, an advisor client could supplement a presenter's materials, such as by pushing content to Bill, which is then mixed with the meeting content.

User interface 400 can additionally include an indication status of active versus inactive participants and/or advisors. For example, the status of active participants or advisors can be indicated by highlighting, color, an extra box around the indication of the participant/advisor, or the like.

User interface 500, illustrated in FIG. 5, illustrates an example in which more than one of the participants provides permission to share visual content with advisors. In this example, Bill, Alex, Grace and Craig are meeting participants. Judy and Bob are advisors to Bill. Either Bill, Bob, or Judy has requested permission to share information with one or more other participants. Grace has granted requisite permission to share her visual content with advisors Judy and Bob. In this case, another private communication channel is established and Grace only shares the content she owns with the advisor(s); she will not be authorized to share the content of other participants—without requesting and receiving authorization from the sharing advisors. In the below diagram, Grace was sharing her browser. Since Grace approved the request to share her visual content with advisors, browser content that contains news article will be visible to the advisors. Grace will be able to converse with any advisors that have received permission to receive information. Grace will not be able to see any other content shared by Judy or Bob unless approved by the respective advisors. Grace can revoke the permission at any time during the meeting, and then she would get back to being a normal attendee in the meeting. Same flow applies to an advisor, if one of the advisors needs to share his content with participants.

Figure 6A:
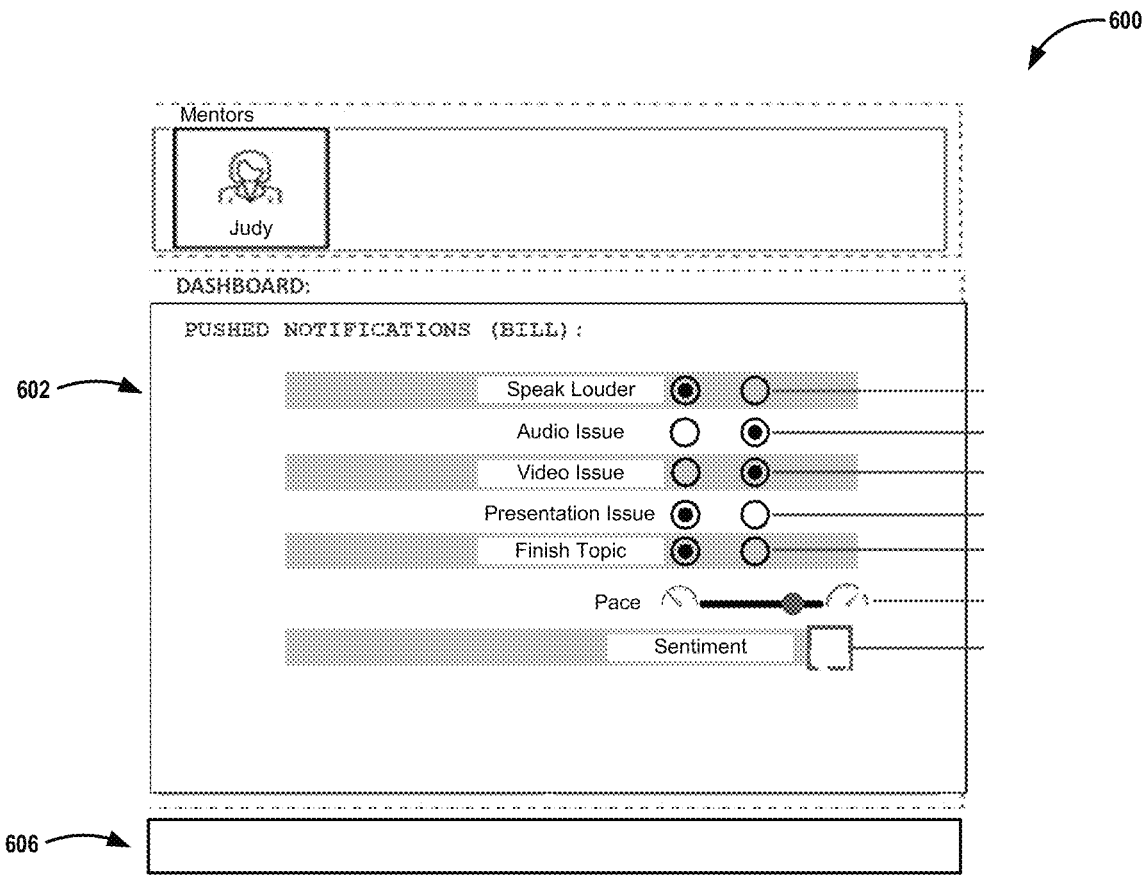
FIG. 6(a) illustrates an advisor user interface in accordance with exemplary embodiments of the disclosure.
Figure 6B:
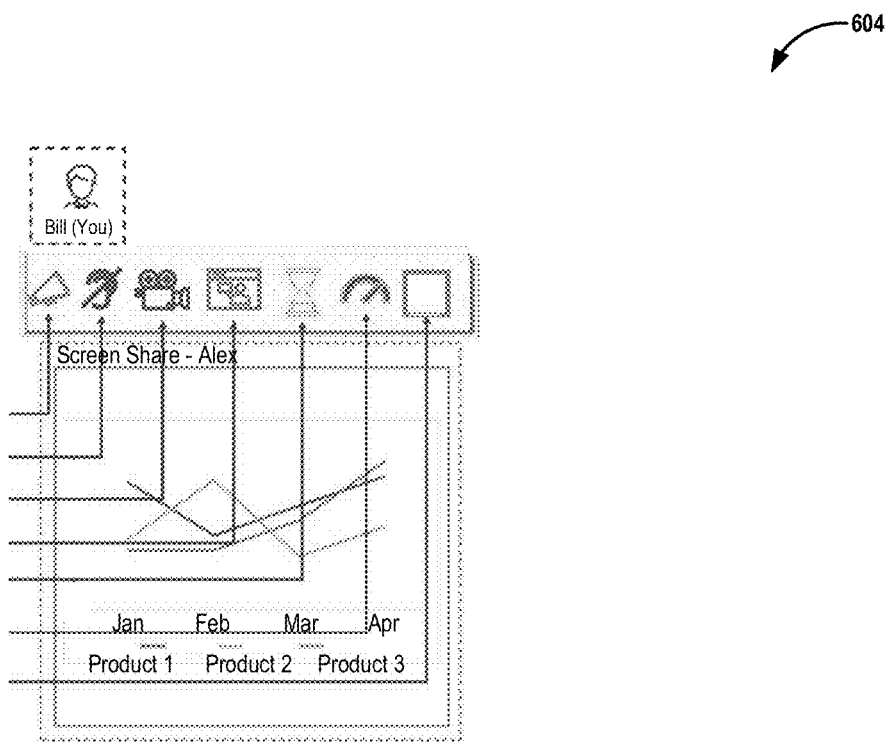
FIG. 6(b) illustrates a corresponding participant user interface.

FIG. 6(a) illustrates an exemplary advisor user interface 600 and FIG. 6(b) illustrates a portion of a corresponding participant user interface. As illustrated, advisor user interface 600 can include an area 602 that displays various options that can quickly (e.g., dynamically using dynamic indicators/icons) convey information to a participant (e.g., Bill) on participant user interface 504. For example, an advisor can quickly select (e.g., via radio button or the like) common presentation feedback, such as participant speech volume, whether audio issues exist, whether video issues exist, whether there are presentation issues, an indication to finish a topic, an indication of pace, sentiment, or the like. As illustrated in connection with participant interface 604, corresponding indicia can be presented on participant user interface 604 (which can be the same or similar to or part of participant user interface 300, 400 and/or 500). Advisor interface 600 can also include an area 606 to send or review information sent or received via a private communication with a participant client.

Figure 7:
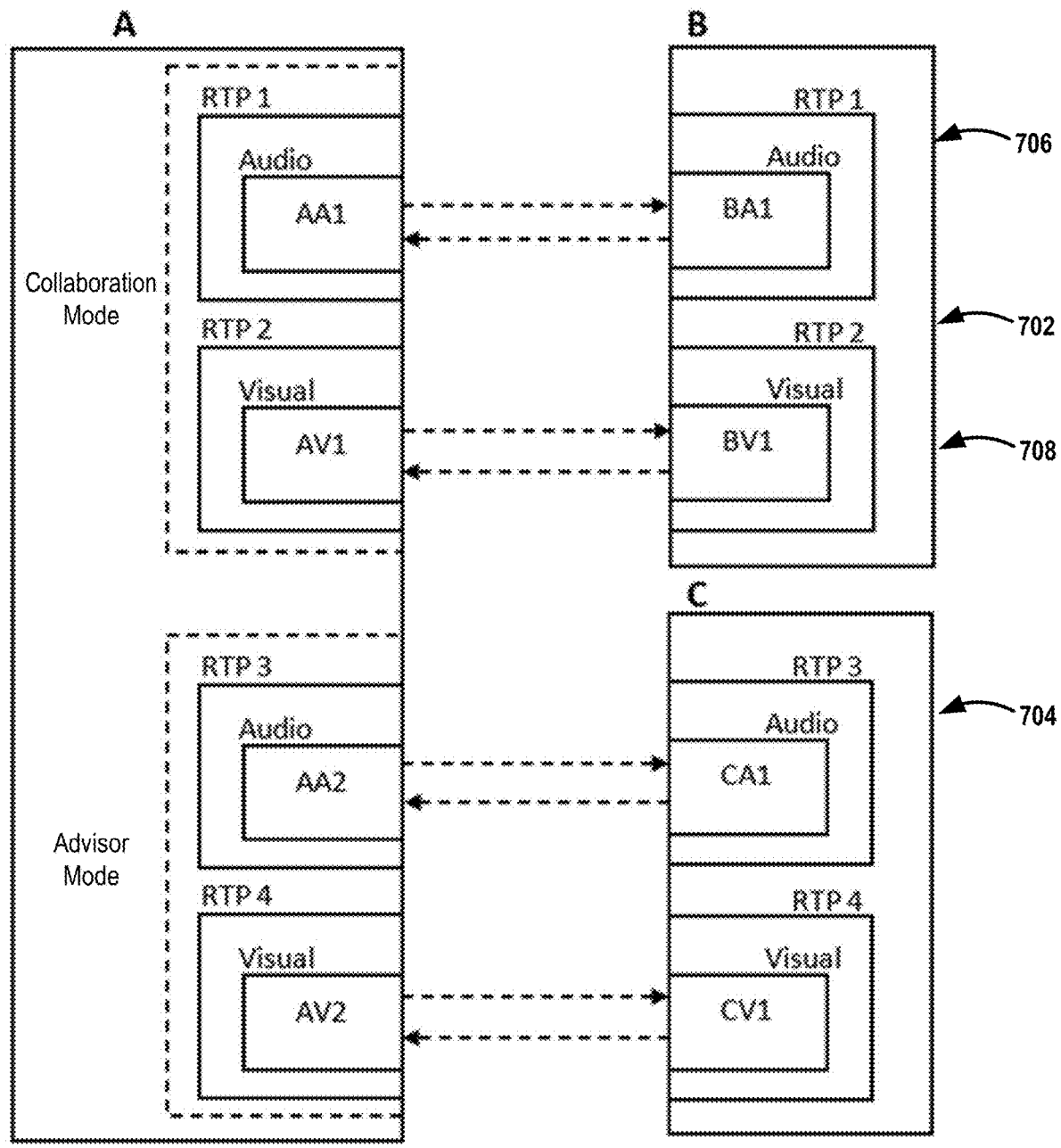
FIG. 7 illustrates a media exchange using a media server in accordance with further exemplary embodiments of the disclosure.
Figure 8:
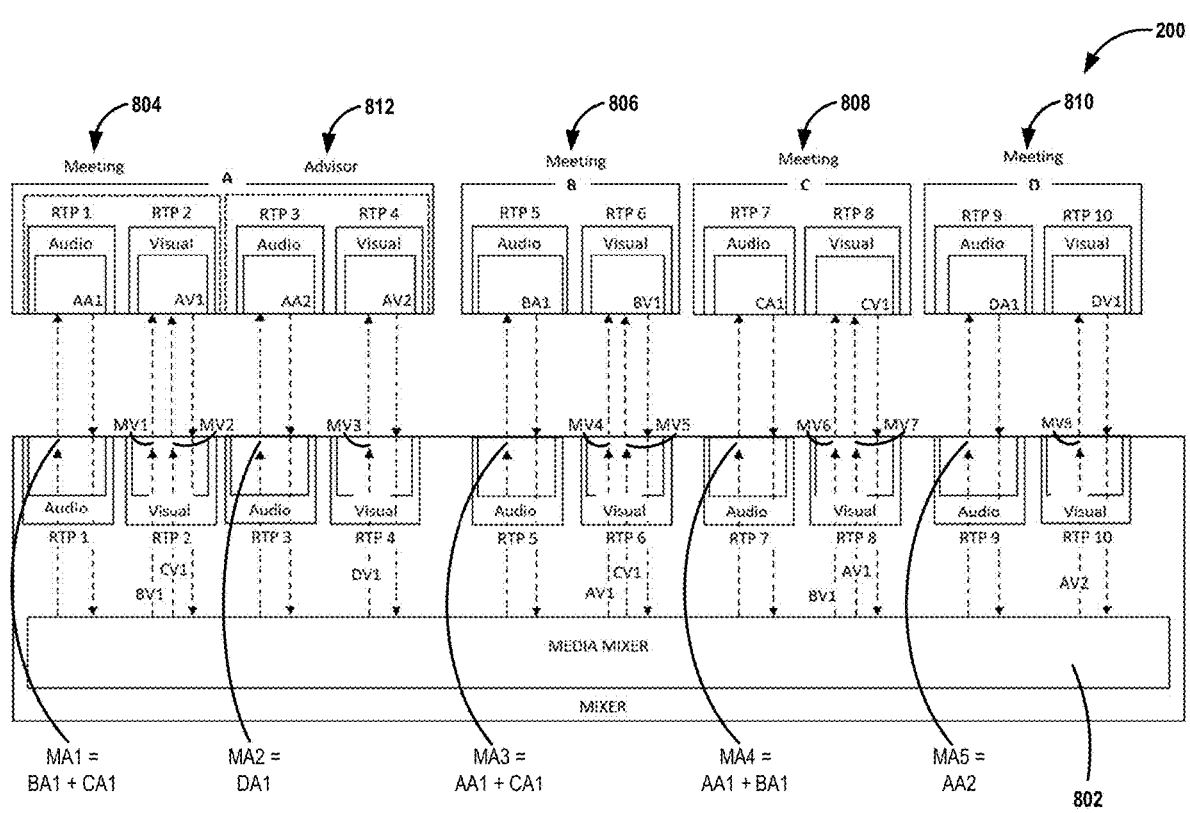
FIG. 8 illustrates a media mixer in accordance with examples of the disclosure.
Figure 9:
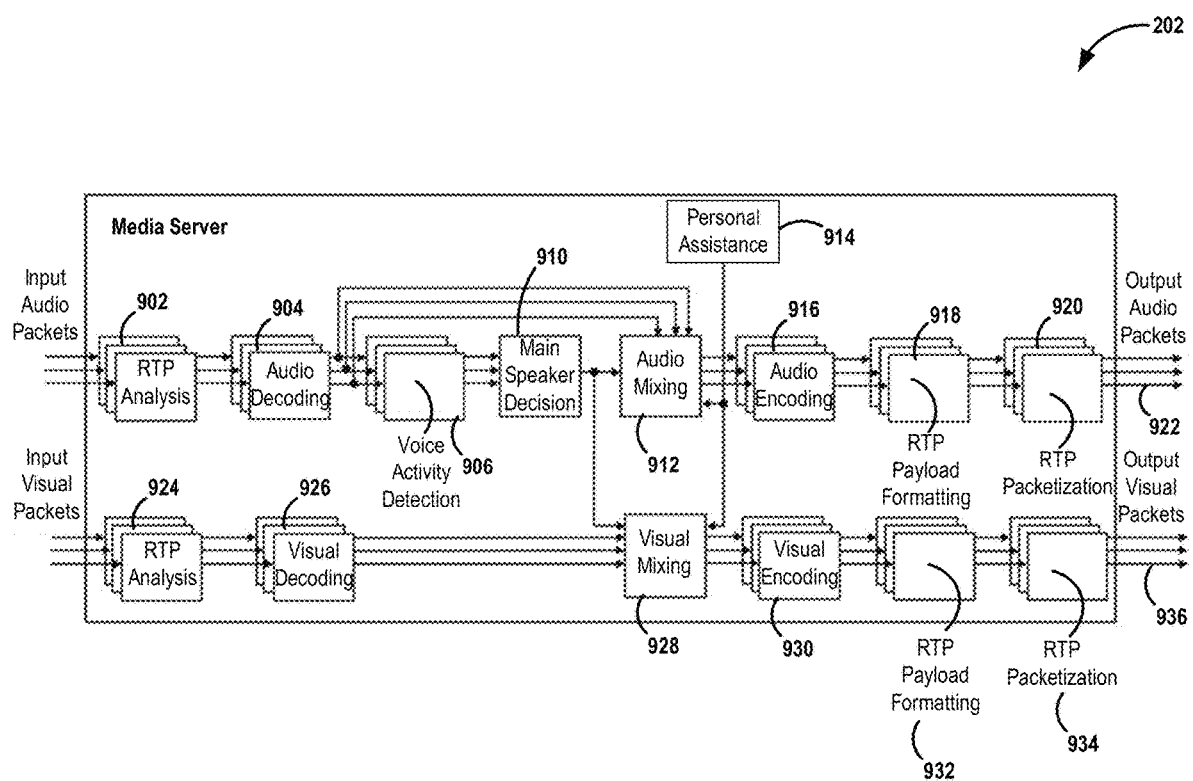
FIG. 9 illustrates a media mixer in accordance with further examples of the disclosure.

FIGS. 7-9 illustrate operation of a media server, such as media server 202 in accordance with examples of the disclosure. Media server 202 allows communication participants to communicate in meeting/collaboration mode, such that each participant can receive (e.g., video and/or audible) information from the other participants and at least one participant can receive visual advisor information via a private communication channel.

In accordance with examples of the disclosure, media server 202 is configured to establish multimedia sessions with a plurality of participants and a private media session between a participant and advisor. With reference to FIG. 7, multimedia sessions 702, 704, which can be established using media server 202, are illustrated. In the illustrated example, two or more participant clients 102-106 establish a communication and exchange information using audio session 706 and video session 708. In the illustrated example, a meeting communication is established between Participant A (e.g., using participant client 102) and Participant B (e.g., using participant client 104). All participants on the meeting communication can hear and/or see information transmitted between Participant A and Participant B.

A separate audio and/or visual session (channel) is set up between an Advisor C (e.g., advisor client 108) and Participant A. To maintain privacy, separate RTP sessions/multimedia sessions are created by media server 202. In accordance with some examples of the disclosure, only visual (e.g., text, images, or video) information is transmitted between advisor client 108 and a participant client (e.g., participant client 102).

FIG. 8 illustrates a scenario where three participants (A, B, and C) and one advisor (D) have joined a meeting via system 100, including media server 202. In the illustrated example, Advisor D has joined the meeting as advisor (e.g., using advisor client 108) to provide visual assistance to Participant A (e.g., using participant client 102). Media mixer 802 mixes audio and/or visual information for users A, B, and C using meeting channels 804-808. A private communications channel 812 is further established between Advisor D and Participant A. In the illustrated case, media mixer 802 receives RTP streams from several endpoints and selects streams for Participants A, B, and C to be included in a media-domain mix. The selection can be through static configuration or by dynamic, content-dependent means, such as voice activation, or the like. Media mixer 802 then creates a single outgoing RTP stream from this mix. As noted above in the examples, in some cases, one or more participants can grant an advisor authorization to hear and/or see their content. In these cases, mixer 802 can create additional private (advisor) channels to convey such content privately between an advisor client and a participant client.

FIG. 9 illustrates a block diagram further illustrating the functions of media server 202. In the illustrated example, media server 202 includes an audio RTP analysis module 902, an audio decoding module 904, a voice activity module 906, a main speaker decision module 910, an audio mixing module 912, an audio encoding module 916, an RTP payload formatting module 918, an RTP packetization module 920, a visual RTP analysis module 924, a visual decoding module 926, a visual mixing module 928, a visual encoding module 930, a visual RTP payload formatting module 932, and a visual RTP packetization module 934.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Modules 902-912, 916-920, 924-934 are generally known. Personal assistance module 914 is configured to keep track of all the participants, their respective advisors to whom permission is granted, and when any permissions for sharing advisor information has been withdrawn.

Meeting participant information and advisor information is received by personal assistance module 914. Personal assistance module 914 then communicates such information to audio mixing module 912 (for meeting participants) and visual mixing module 928 (for participants and advisors). Outbound media streams 922 and 936 are mixed appropriately and sent to the participant and advisor clients as directed by information received from personal assistance module 914.

In accordance with additional examples of the disclosure, an electronic communication method is provided. The electronic communication method can be configured to provide visual assistance from an advisor to a participant of an electronic communication. Exemplary methods include using a communication network, establishing the electronic communication between two or more participants; using a participant client, inviting a first advisor to join a private communication between a participant of the participants and the first advisor; using a media server, mixing audio information from the participants during the electronic communication; and using the media server, providing private communication information from the first advisor to the participant during the electronic communication. In some cases, the method can further include a step of the participant using the participant client to selectively communicate with the first advisor or one or more other participants. Exemplary methods can further include a step of requesting permission from one or more of the other participants to allow access to communication information by the advisor. Upon granting of such permission by another participant, another private communication channel can be formed, such that private information can be sent between the advisor and the other participant. In some cases, a participant may initiate the request for permission from one or more of the other participants. In other cases, an advisor (e.g., acting on behalf of a participant) can request such permissions. In accordance with further examples, a method includes a step of using the participant client, inviting a second advisor to join a private communication. In such cases, a media server (e.g., media server 202) provides information from the first advisor and the second advisor to the participant. The information from the advisors can be conveyed by separate channels/sessions and/or can be mixed and provided as a single "advisor" channel/session. When a participant has granted permission or is associated with two or more advisors, in some cases, information can be shared by the media server between the advisors. Participant clients can be used to request advisors attend a communication and/or authorize the advisor to join the private communication. Similarly, an advisor client can be used to accept a request to advise. As noted above, meeting information can be stored (e.g., on storage device 204 (e.g., a server)) during a meeting. In accordance with examples of the disclosure, one or more participant clients and/or one or more advisor clients can manipulate the meeting information. Further, in some cases, an advisor client can push information to other meeting participants and/or can push information to an advisee participant client, which, in turn, can push the information to other participant clients.

In accordance with yet further examples of the disclosure, an electronic communication method to provide visual assistance to a participant of an electronic communication includes using a communication network, establishing the electronic communication comprising participant information between two or more participants; using a participant client, inviting an advisor to join a private communication between a participant of the participants and the advisor; using a media server, mixing audio information from the participants during the electronic communication; using the media server, providing a private communication channel between an advisor and the participant; displaying private communication information on a participant device; and providing the participant information on the participant device.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. For example, although described in connection with advisor clients sharing visual information, in some cases, e.g., when all participants have granted permission for an advisor to join a communication or when an advisor is pushing information to one or more participants, the advisor client may also provide audio information. These and other changes or modifications are intended to be included within the scope of the present invention, as expressed in the following claims.

The invention claimed is:

1. An electronic communication method to provide visual assistance to a participant of an electronic communication, the method comprising the steps of:
   using a communication network, establishing the electronic communication between two or more participants;
   using a participant client, inviting a first advisor to join a private communication between a participant of the participants and the first advisor;
   using a media server, mixing audio information from the participants during the electronic communication; and
   using the media server, providing private communication information from the first advisor to the participant during the electronic communication.

2. The electronic communication method of claim 1, further comprising a step of the participant using the participant client to selectively communicate with the first advisor or one or more other participants.

3. The electronic communication method of claim 1, further comprising a step of requesting permission from one or more of the other participants to allow access to communication information by the advisor.

4. The electronic communication method of claim 3, wherein, upon granting of access, another private communication channel is formed.

5. The electronic communication method of claim 1, further comprising a step of using the participant client, inviting a second advisor to join a private communication.

6. The electronic communication method of claim 5, wherein the media server provides information from the first advisor and the second advisor to the participant.

7. The electronic communication method of claim 6, wherein the media server provides information from the second advisor to the first advisor.

8. The electronic communication method of claim 5, wherein the media server provides information from the first advisor to the second advisor.

9. The electronic communication method of claim 1, further comprising a step of using the participant client, authorizing the advisor to join the private communication.

10. The electronic communication method of claim 1, further comprising a step of storing meeting information on a server.

11. The electronic communication method of claim 10, further comprising a step of the advisor editing the meeting information.

12. The electronic communication method of claim 1, wherein the participant client displays the private communication information on a participant device.

13. The electronic communication method of claim 1, wherein the private communication information comprises audio information.

14. The electronic communication method of claim 1, wherein the participant provides information provided by the advisor to the other participants.

15. An electronic communication system comprising:
   a participant client;
   an advisor client;
   a media server communicatively coupled to the participant client and the advisor client;
   a storage device coupled to the media server;
   a streaming server coupled to the storage device; and
   a content delivery network coupled to the streaming server,
   wherein the participant client communicates with one or more other participant clients using a first channel of the media server, and
   wherein the participant client and the advisor client communicate in private mode using a second channel of the media server.

16. The electronic communication system of claim 15, wherein the participant client displays information received on the first channel and information received on the second channel.

17. The electronic communication system of claim 15, wherein a protocol used to transmit information over the second channel comprises real-time transport protocol.

18. The electronic communication system of claim 15, wherein the storage device stores meeting information.

19. The electronic communication system of claim 18, wherein the advisor client is used to edit the meeting information.

20. An electronic communication method to provide visual assistance to a participant of an electronic communication, the method comprising the steps of:
   using a communication network, establishing the electronic communication comprising participant information between two or more participants;
   using a participant client, inviting an advisor to join a private communication between a participant of the participants and the advisor;
   using a media server, mixing audio information from the participants during the electronic communication;
   using the media server, providing a private communication channel between an advisor and the participant;
   displaying private communication information on a participant device; and providing the participant information on the participant device.

\* \* \* \* \*